United States Patent [19]
Vercauteren et al.

[11] Patent Number: 5,805,580
[45] Date of Patent: Sep. 8, 1998

[54] CELL SWITCHING NETWORK

[75] Inventors: Leo Albert Albertine Vercauteren, Gent; Johan André De Vriendt, Drongen, both of Belgium

[73] Assignee: Alcatel N.V., Netherlands

[21] Appl. No.: 597,620

[22] Filed: Feb. 6, 1996

[30] Foreign Application Priority Data

Feb. 6, 1995 [EP] European Pat. Off. ............. 95200286

[51] Int. Cl.⁶ ............................. H04Q 7/24; H04L 12/56; H04B 7/26
[52] U.S. Cl. .......................... 370/331; 370/379; 455/436
[58] Field of Search .................... 370/328, 329, 370/331, 913, 395, 396, 397, 332, 336, 337, 338; 455/436, 445

[56] References Cited

U.S. PATENT DOCUMENTS

| 5,434,853 | 7/1995 | Hemmady et al. | 370/331 |
| 5,438,565 | 8/1995 | Hemmady et al. | 370/331 |
| 5,487,065 | 1/1996 | Acampora et al. | 370/331 |
| 5,633,868 | 5/1997 | Baldwin et al. | 370/331 |

OTHER PUBLICATIONS

"Asynchronous Transfer Mode" by Martin De Prycker and edited by Ellis Horwood Limited, 1991, p. 99, Figure 3.1, and p. 106.

*Primary Examiner*—Min Jung
*Attorney, Agent, or Firm*—Ware, Fressola, Van der Sluys & Adolphson LLP

[57] ABSTRACT

The present invention discloses a cell switching network which includes a cell switch (AS) coupled to a first terminal (T1) and a function unit (FU). The cell switch is also coupled to a second and a third terminal (T2,T3) via a cell switching access network (AAN). The first terminal exchanges information with the second terminal via the function unit (FU) and a predetermined part of the information is indicative of the information exchange between the first and the second terminal. The function unit is adapted to process the information and modifies the above predetermined part of the information so that it becomes indicative of information exchange between the function unit and the third terminal. The information is thereupon exchanged between the first and the third terminal via the function unit.

2 Claims, 1 Drawing Sheet

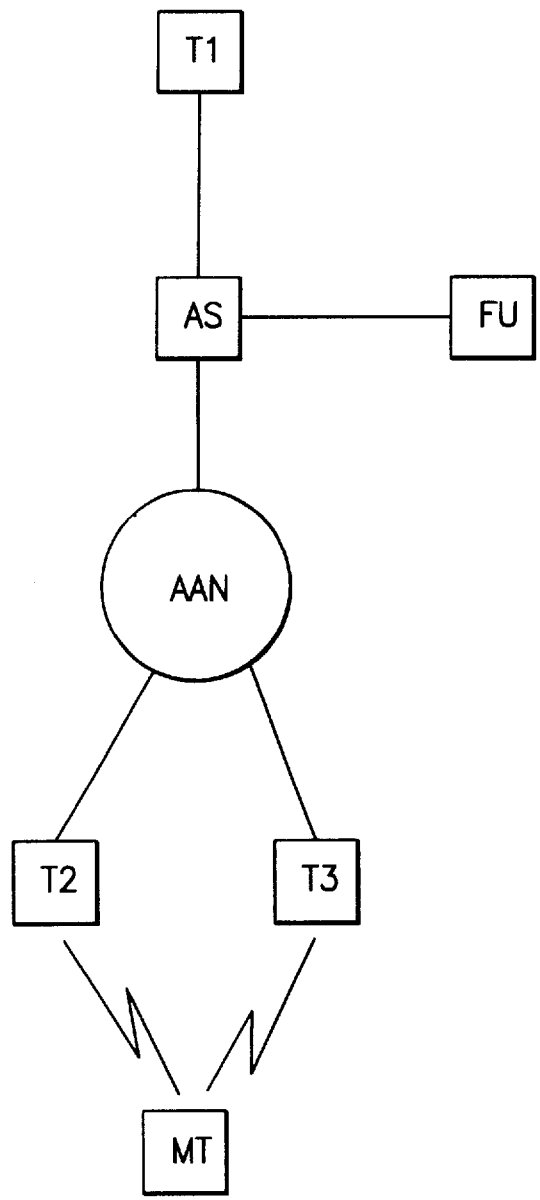

CELL SWITCHING NETWORK

TECHNICAL FIELD

The present invention relates to a broadband cell switching network including a cell switch coupled to at least a first, a second and a third terminal, the first terminal being adapted to exchange information with the second terminal, a predetermined part of the information being indicative of the information exchange with the second terminal.

BACKGROUND OF THE INVENTION

Such a network is already known in the art, e.g. from the book 'Asynchronous Transfer Mode' by Martin De Prycker and edited by Ellis Horwood Limited 1991, page 99 FIGS. 3.1. The second and third terminal are for instance adapted to exchange information over an air interface with a mobile terminal. A connection between the second or the third terminal and the first terminal then makes it possible for the mobile terminal to exchange information with the first terminal via the broadband cell switching network. Initially the mobile terminal exchanges the information with the second terminal but due to worsening quality of the above air interface a so called 'handover' is performed whereafter the mobile terminal exchanges the information via and with the third terminal. It is clear that the handover execution has an impact on the operation of the cell switching network.

SUMMARY OF THE INVENTION

An object of the present invention is therefore to provide a cell switching network as the known one, but wherein the impact of handover execution is minimal.

This object is achieved by a broadband cell switching network, that further includes a function unit (FU) also coupled to the cell switch, the information being exchanged via the function unit, the function unit processing the information and modifying the predetermined part of the information so that the predetermined part becomes indicative of information exchange between the function unit and the third terminal, the information is thereupon exchanged between the first and the third terminal via the function unit.

In this way, the information which originated from the first terminal passes through the cell switch to the function module where it is processed and thereafter the information is switched by the same cell switch to the second or the third terminal depending on the predetermined part of the information. As a result, the handover execution has no impact on the cell switch itself.

Indeed, the handover execution is performed in the function unit by modifying the predetermined part of the information.

The broadband cell switching network, may also have the second and third terminals coupled to the switch via a cell switching network. Such a broadband switching network allows the second and third terminals to be located in a large geographical area.

Indeed, the cell switching access network covers a large area wherein terminals like the second and third terminals may be coupled to the cell switch.

BRIEF DESCRIPTION OF THE DRAWING

The above mentioned and other objects and features of the invention will become more apparent and the invention itself will be best understood by referring to the following description of an embodiment taken in conjunction with the accompanying drawing which schematically represents a broadband cell switching network according to the invention.

Referring to the FIGURE, an Asynchronous Transfer Mode or ATM network is shown which includes an ATM switch AS whereto a first terminal T1, a function unit FU and an ATM access network AAN are connected. A second terminal T2 and a third terminal, T3 are coupled to the above ATM access network.

The second and the third terminal are so called base stations which are used in a mobile communication network to provide the air interface with a mobile terminal MT. Such a mobile communications network is for instance the Global System for Mobile communications or GSM network. The GSM air interface is standardized and well known in the art. The second and third terminals include so called interworking modules (not shown) which enable the interworking of ATM communication and GSM communication. The implementation of these interworking modules is beyond the scope of the invention and is therefore not described in detail. In the same way, the overall operation of the ATM network; i.e. the ATM switch AS and the ATM access network AAN, is well known in the art.

The first terminal T1 exchanges information with the mobile terminal MT via the second terminal over a communication link or a so called VP/VC ATM connection within the ATM network and the above information is transported through the above ATM network in the form of ATM cells which include a data part and a header part as described in the above mentioned book on page 106. For information which is sent in ATM cells from the first terminal T1 via the second terminal T2 to the mobile terminal MT, the header part of the latter cells contains the VP/VC connection identification of the communication link between the first terminal and the mobile terminal MT via the second terminal T2. In practice the latter cells are routed in the AAN network to the second terminal T2 via the AAN network part of the above mentioned VP/VC connection.

The latter cells are switched in the switch AS from the first terminal T1 to the function unit FU where the data part of these cells is processed and the processed cells are thereafter forwarded to the switch AS, again wherein they are switched to the ATM access AAN network to be transported to the second terminal. One interworking module of the second terminal converts the received ATM cells into proper GSM frames which are transmitted over the above mentioned GSM air interface to the mobile terminal MT. The header information of the VP/VC connection is converted by another interworking module into time slot information of the Time Division Multiple Access or TDMA protocol of the GSM air interface. In this way, the mobile terminal MT receives the information in the time slots which were assigned to the mobile terminal MT by the TDMA access protocol.

It should be noted that the processing of the data part of the ATM cells includes for instance so called source coding, data (de) compression or rate adaptation, buffering and so called 'in band signalling' between the function unit and the second or the third terminal.

When the quality of the air interface worsens because of so called 'roaming' of the mobile terminal MT away from the second terminal T2 towards the third terminal T3, a handover is to be performed from the second terminal T2 to the third terminal T3. This means that the above information which is exchanged via the second terminal T2 before the handover, is exchanged via the third terminal T3 after the handover. In order to exchange the information via the third terminal T3, a new VC/VP connection is set up in the ATM network between the function unit FU and the third terminal T3. As it is well known in the art of ATM networks how this is done, this is not described in further detail here.

The actual handover execution after the new VP/VC connection has been set up between the function unit FU and the third terminal T3, is performed in the function unit FU and not in the ATM switch AS. In this way, the impact of the handover execution on the AS switch is minimal. The handover execution is performed in the function unit FU by changing the header part of the ATM cells so that it is indicative of the new VC/VP connection. Consequently, the ATM cells are routed from the function unit FU towards the third terminal T3 where similar interworking modules as in the second terminal provide the information contained in the latter cells, over the air interface to the mobile terminal MT. Now that the handover is executed, that part of the old VC/VP connection between the function unit FU and the second terminal T2 is 'released' whereas the part of the old VP/VC connection between the first terminal T1 and the function unit FU is still in use. Indeed, it is only after the header is changed in the function unit FU that the new VC/VP connection is used.

It should be noted that it is well known in the art how the release of the VC/VP connection between the function unit FU and the second terminal T2 is to be performed in the above ATM network. It is therefore not described in detail. The actual decision by the FU unit to change the header is taken on the basis of control information which is exchanged between the GSM-ATM interworking modules in the second and the third terminal. This control information is for instance provided via above mentioned in band signalling between the FU unit and the second and third terminal T2 and T3.

It is important to note that the second and the third terminal T2 and T3 also include interworking modules which convert TDMA time slot information into VC/VP connection information for the header of ATM cells which are routed via the ATM network from the second or third terminal T2 or T3 towards the first terminal T1 via the function unit FU where the data part of the latter ATM cells is processed.

The implementation of the function unit FU is software oriented, as is the implementation of the interworking modules. For a person skilled in the art, the above implementations are readily obtained from the ATM and GSM standard specifications and from the above description of the invention.

While the principles of the invention have been described above in connection with specific apparatus, it is to be clearly understood that this description is made only by way of example and not as a limitation on the scope of the invention.

We claim:

1. A cell switching network including a cell switch (AS) coupled to at least a first, a second and a third terminal (T1, T2, T3), said first terminal being adapted to exchange information with said second terminal, a predetermined part of said information being indicative of said information exchange with said second terminal, characterized in that said cell switching network further includes a function unit (FU) also coupled to said cell switch, said information being exchanged via said function unit, said function unit processing said information and modifying said predetermined part of said information when the quality of the information between the cell switch (AS) and the second terminal (T2) worsens to a predetermined level wherein said modifying said predetermined part of said information causes said predetermined part to become indicative of information exchange between said function unit and said third terminal, so that said information is exchanged between said first and said third terminal via said function unit.

2. A cell switching network according to claim 1, characterized in that said second terminal and said third terminal are coupled to said cell switch via a cell switching access network (AAN).

* * * * *